United States Patent
Geffner

(10) Patent No.: US 9,661,097 B2
(45) Date of Patent: May 23, 2017

(54) SYSTEM AND METHOD FOR CACHING CONTENT AT AN END USER'S CUSTOMER PREMISES EQUIPMENT

(71) Applicant: Evan Geffner, New York, NY (US)

(72) Inventor: Evan Geffner, New York, NY (US)

( * ) Notice: Subject to any disclaimer, the term of this patent is extended or adjusted under 35 U.S.C. 154(b) by 94 days.

(21) Appl. No.: 13/624,277

(22) Filed: Sep. 21, 2012

(65) Prior Publication Data

US 2014/0089448 A1 Mar. 27, 2014

(51) Int. Cl.
*H04L 29/08* (2006.01)
*H04L 29/06* (2006.01)

(52) U.S. Cl.
CPC ...... *H04L 67/2842* (2013.01); *H04L 65/4076* (2013.01); *H04L 67/22* (2013.01)

(58) Field of Classification Search
CPC . G06F 15/167; G06F 17/30902; H04L 63/20; H04L 67/2842; H04L 67/2847; H04L 67/22; H04L 65/4076; H04L 29/08729; H04L 29/08801
USPC .......................... 709/213, 235, 203; 711/122
See application file for complete search history.

(56) References Cited

U.S. PATENT DOCUMENTS

| | | | | |
|---|---|---|---|---|
| 7,653,689 B1* | 1/2010 | Champagne | ....... | H04N 21/2402 709/203 |
| 2007/0192444 A1* | 8/2007 | Ackaouy | ............. | H04L 67/2852 709/219 |
| 2008/0229020 A1* | 9/2008 | Plamondon | .................... | 711/122 |
| 2009/0210899 A1* | 8/2009 | Lawrence-Apfelbaum | | H04L 12/2801 725/34 |
| 2009/0219939 A1* | 9/2009 | Isosaari | ............. | H04L 29/06027 370/400 |
| 2010/0121940 A1* | 5/2010 | Reeser | .......................... | 709/219 |
| 2011/0010733 A1* | 1/2011 | Godas | ................. | H04L 41/0681 725/27 |
| 2011/0302320 A1* | 12/2011 | Dunstan | ............ | G06F 17/30017 709/235 |
| 2013/0246156 A1* | 9/2013 | Murphy et al. | ............ | 705/14.36 |
| 2013/0318629 A1* | 11/2013 | Lajoie et al. | .................... | 726/28 |
| 2014/0105263 A1* | 4/2014 | Geile | ............................ | 375/222 |

\* cited by examiner

*Primary Examiner* — Kevin Bates
*Assistant Examiner* — Chen-Liang Huang
(74) *Attorney, Agent, or Firm* — Rothwell, Figg, Ernst & Manbeck, p.c.

(57) ABSTRACT

A caching method and device for reducing non-local network traffic by caching content at equipment at the premises of one or more end users. The caching device may be connected to a non-local network of a data distribution network that may include the non-local network, a headend connected to the non-local network, a content delivery server connected to the headend and a content source connected to the headend. The premises equipment may include a caching device including a controller and storage medium. The caching device at an end user premises may receive content, which may be sent to a plurality of end user premises as part of a multicast, over a non-local network. The end user may access the received content at local network speeds without having to send an individual request for the content over the non-local network.

19 Claims, 5 Drawing Sheets

SYSTEM AND METHOD FOR CACHING CONTENT AT AN END USER'S CUSTOMER PREMISES EQUIPMENT

BACKGROUND

Field of Invention

The present invention relates to reducing non-local network traffic. More specifically, this invention relates to caching content in equipment at the premises of one or more end users.

Discussion of the Background

Content Delivery Networks (CDNs) have sprung up at the headends of most large internet service providers (ISPs) over the past 15 years or so. CDNs cache content (e.g., time sensitive content) from one or more content sources (e.g., central servers). Relative to the central servers, CDNs are strategically placed to be closer to the customer (i.e., end user). When an end user requests content that has been cached in a CDN, the CDN serves the content to the customer and eliminates the need for the content source to serve the content to the customer. The goal of CDNs is to make the customer's experience better providing content faster and more reliably than the content sources by themselves could.

FIG. 1 is a schematic diagram illustrating an example of a conventional data distribution system 100 in which modems 102 at customer premises receive content from a headend (i.e., master facility for receiving content signals for processing and distribution) 104. The system 100 may be, for example, a cable system in which the modems 102 are cable modems and in which the headend 104 includes a cable modem termination system (CMTS). The CMTS may provide high speed data services, such as cable Internet or voice over internet protocol (VOIP), to end users (e.g., subscribers or customers). In another example, the system 100 may be a digital subscriber line (DSL) system in which modems 102 are DSL modems and in which the headend 104 includes a DSL access multiplexer (DSLAM).

One or more CDN servers 106 of one or more CDNs may be connected (e.g., directly or through the internet 108) to the headend 104. The CDN servers 106 may cache content from one or more content sources (e.g., content servers) 110. The headend 104 may receive content from one or more of the CDN servers 106 and/or one or more of the content sources 110 through the internet 108. The headend 104 may provide content received from one or more CDN servers 106 and/or one or more content sources 110 to one or more customers via a non-local network 112.

A non-local network, such as non-local network 112, can best be defined relative to a local network (e.g., a local area network) that interconnects computers in a limited area such as a home, school, computer laboratory or office building and does not use leased telecommunication lines (i.e., telecommunication lines to which a service provider grants access in return for compensation). In contrast with local networks, non-local networks typically have lower datatransfer rates and larger geographic area and use leased telecommunication lines. The non-local network 112 may be, for example, a wide area network (WAN) or metropolitan area network (MAN). The non-local network 112 may be, for example, a broadband network, such as a hybrid fiber/coaxial (HFC) network, or a telephone network.

A customer receives and/or transmits information from/to non-local network 112 using equipment at the customer's premises (i.e., customer-premises equipment (CPE)), which may include the modem (e.g., cable modem or DSL modem) 102. The CPE may additionally include a firewall/router 114 (e.g., network address translation (NAT) router) and switch 116 and one or more computers 117, which may be connected over a local area network (in contrast to the non-local network leading up to the customer premises). The one or more computers 117 of the CPE may, for example, be located at a home, school, computer laboratory or office building.

FIG. 2 is a schematic diagram illustrating an example of a conventional modem 102 that is a conventional cable modem. The conventional cable modem may include a network interface (e.g., coaxial interface) 218, tuner 220, demodulator 222, media access control (MAC) controller 224, modulator 226, central processing unit (CPU) 228, network components 230 and an interface (e.g., Ethernet and/or USE interface) 232. The conventional cable modem receives data from and transmits data to non-local network 112 via network interface 218. The tuner 220 retrieves modulated data from a particular set of frequencies or channel(s) from the interface 218 and passes the modulated data to the demodulator 222, which demodulates the modulated data. The MAC controller 224 receives demodulated data from the demodulator 222, processes the demodulated data according to a MAC protocol and passes it to the CPU 228 and/or network components 230 for processing before being output on interface 232. Data received from interface 232 is processed by the network components 230 and/or CPU 228 before being processed according to the MAC protocol by MAC controller 224 and passed to the modulator 226, which modulates the data before transmitting it to the non-local network 112 via network interface 218.

Using the conventional system 100, requests for content are individually sent from each CPE (e.g., modem 102, firewall/router 114 and switch 116). Each request must traverse the entire non-local network 112. After a request reaches the one or more CDN servers 106, if the one or more CDN servers 106 has cached the requested content, the one or more CDN servers 106 transmits the requested content over the non-local network 112 to the individual CPE that requested the content. If the one or more CDN servers 106 has not cached the requested content, the request is forwarded to a content source 110 over the Internet transit network 108. The content source 110 then transmits the requested content over Internet transit network 108 and non-local network 112 to the individual CPE that requested the content. This procedure is repeated for each of the individual requests for content.

Previously, saturation points existed in the interconnects between the networks that make up the internet (i.e., backbones). However, today, backbone bandwidth is plentiful. Instead, the choke point of most internet traffic today exists in the "last mile" connections (i.e., the connections between the headend 104 and the modems 102 over the non-local network 112). In other words, internet traffic congestion issues today are "edge" related in the sense that the choke points are at the outer edges of the data distribution network.

Cable modem technology is a perfect example of this saturation. As more and more users share a particular node (e.g., a fiber optic node of the HFC network), the available shared bandwidth gets used up quite quickly. For example, a 3:00 pm slowdown phenomenon in residential neighborhoods, which occurs around the time when children come home from school, is apparent in most cable systems. Cable systems operate within a finite 850 Mhz bandwidth, and this limits the extent to which cable modem speed may be expanded without having to remove chunks of video programming content. Conventional cable systems are simply running out of room.

Accordingly, there is a need in the art for improved modem speed and reliability.

SUMMARY

The present invention relates to reducing non-local network traffic. More specifically, this invention relates to caching content in equipment at the premises of one or more end users.

One aspect of the invention relates to a method for reducing transmissions over a non-local network in a data distribution system. The data distribution system may comprise the non-local network, a headend connected to the non-local network, a content delivery network server connected to the headend, a content source connected to the headend and an end user's customer premises equipment (CPE) connected to the non-local network. The end user's CPE may comprise a computer and a caching device including a controller and a storage medium. The method may comprise receiving, by the caching device, a request for content from the computer of the end user's CPE. The method may comprise determining, by the caching device, whether the requested content is stored in the storage medium of the caching device. The method may comprise, if the requested content is determined to be stored in the storage medium of the caching device, transmitting, by the caching device, the requested content from the storage medium to the computer of the end user's CPE without transmitting the request for content over the non-local network. The method may comprise, if the requested content is determined to not be stored in the storage medium of the caching device: (i) transparently transmitting, by the caching device, the request for content over the non-local network to the content delivery network server or to the content source, (ii) receiving, by the caching device, the requested content over the non-local network from the content delivery network server or the content source, and (iii) transmitting, by the caching device, the received requested content to the computer of the end user's CPE.

In some embodiments, the method may further comprise: receiving, by the caching device, content over the non-local network, and storing, by the caching device, the received content in the storage medium of the caching device. The received content may be received over the non-local network as part of a multicast.

In some embodiments, the method may further comprise gathering, by the caching device, network traffic statistics and transmitting, by the caching device, the network traffic statistics over the non-local network to an intelligence platform. The method may further comprise receiving, by the caching device, content over the non-local network. The received content may have been determined by the intelligence platform to likely be relevant to the end-user based on the network traffic statistics. The method may further comprise storing, by the caching device, the received content in the storage medium of the caching device. The received content may be received over the non-local network as part of a multicast.

In some embodiments, the end user's CPE may comprise a router, and the caching device may receive the request for content from the computer by way of the router. The requested content may be a software update. The requested content may be video or audio content. The non-local network may be a cable network. The cable network may be a hybrid fiber/coaxial network. The end user's CPE may comprise a modem, and the modem may comprise the caching device.

Another aspect of the invention relates to a caching device configured to cache data at an end user's customer premises equipment (CPE) connected to a non-local network in a data distribution system comprising the non-local network, a headend connected to the non-local network, a content delivery network server connected to the headend and a content source connected to the headend. The end user's CPE may comprise a computer and the caching device. The caching device may comprise: a storage medium and a controller. The controller may be configured to: receive a request for content from the computer of the end user's CPE, determine whether the requested content is stored in the storage medium, if the requested content is determined to be stored in the storage medium, transmit the requested content from the storage medium to the computer of the end user's CPE without transmitting the request for content over the non-local network, and, if the requested content is determined to not be stored in the storage medium: (i) transparently transmit the request for content over the non-local network to the content delivery network servers or to the content source, (ii) receive the requested content over the non-local network from the content delivery network servers or the content source, and (iii) transmit the received requested content to the computer of the end user's CPE.

In some embodiments, the controller may be further configured to: receive content over the non-local network, and store the received content in the storage medium of the caching device. The content may be received over the non-local network as part of a multicast.

In some embodiments, the controller is further configured to: gather network traffic statistics, transmit the network traffic statistics over the non-local network to an intelligence platform, receive content over the non-local network, and store the received content in the storage medium. The received content may have been determined by the intelligence platform to likely be relevant to the end-user based on the network traffic statistics. The received content may be received over the non-local network as part of a multicast.

In some embodiments, the end user's CPE may comprise a router, and the request for content may be received from the computer by way of a router. The requested content may be a software update. The requested content may be video or audio content. The non-local network may be a cable network. The cable network may be a hybrid fiber/coaxial network. The end user's CPE may comprise a modem, and the caching device is part of the modem.

In some embodiments, the modem may be a cable modem that comprises, in addition to the caching device: a network interface configured to transmit and receive content to and from the non-local network, a demodulator configured to demodulate content received from the non-local network, a modulator configured to modulate content to be transmitted on the non-local network, a media access control controller, a central processing unit, and an interface configured to transmit and receive content to and from the computer of the end user's CPE.

Other features and characteristics of the present invention, as well as the methods of operation, functions of related elements of structure and the combination of parts, and economies of manufacture, will become more apparent upon consideration of the following description and the appended claims with reference to the accompanying drawings, all of

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION OF PREFERRED EMBODIMENTS

The present invention, including but not limited to the embodiments described herein, relates to caching content from one or more content sources in equipment at the premises of one or more end users (i.e., at the "absolute edge" of the data distribution network).

Figure 1:
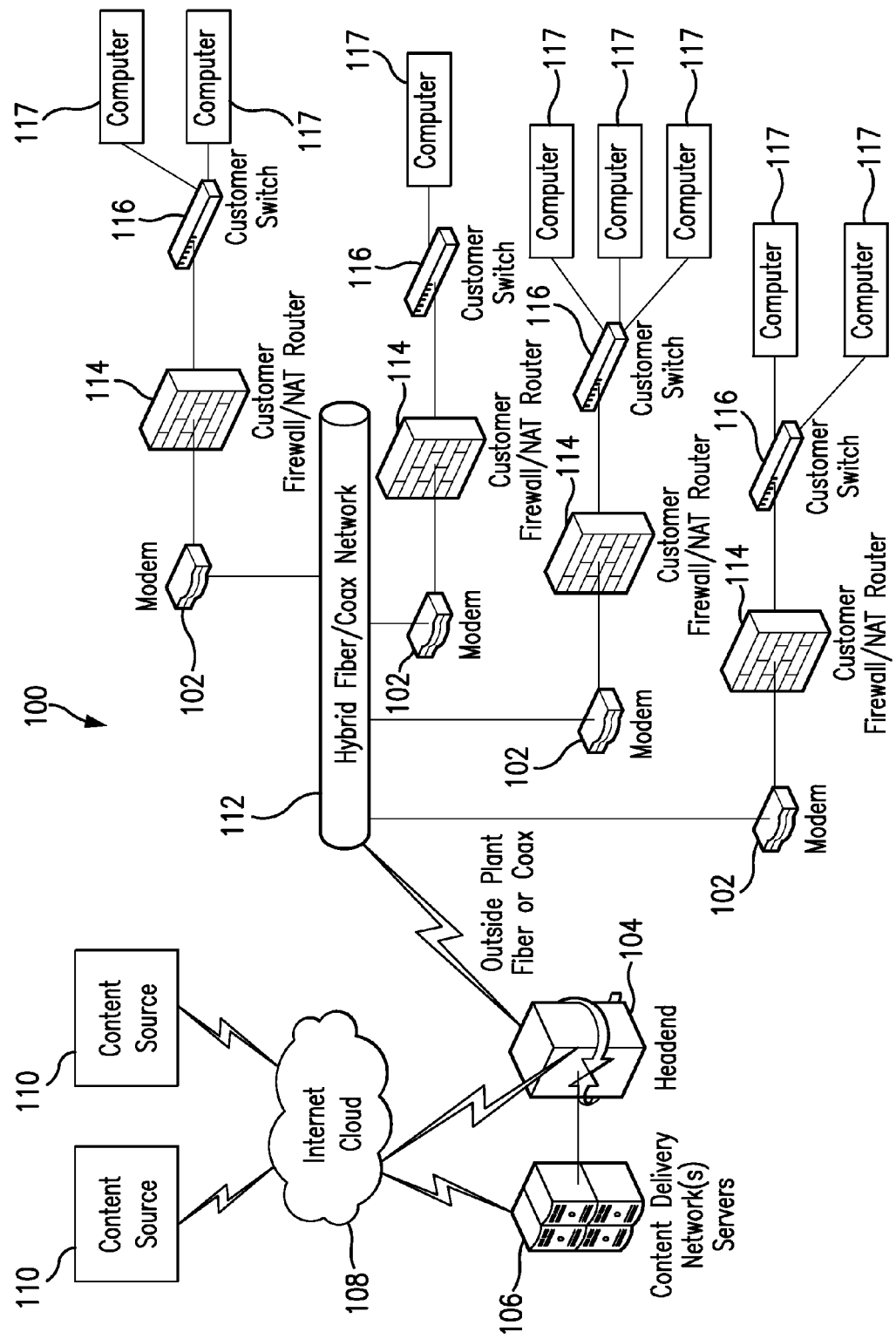
FIG. 1 is a schematic diagram illustrating an example of a conventional data distribution system in which modems at customer premises receive content from a headend.
Figure 3:
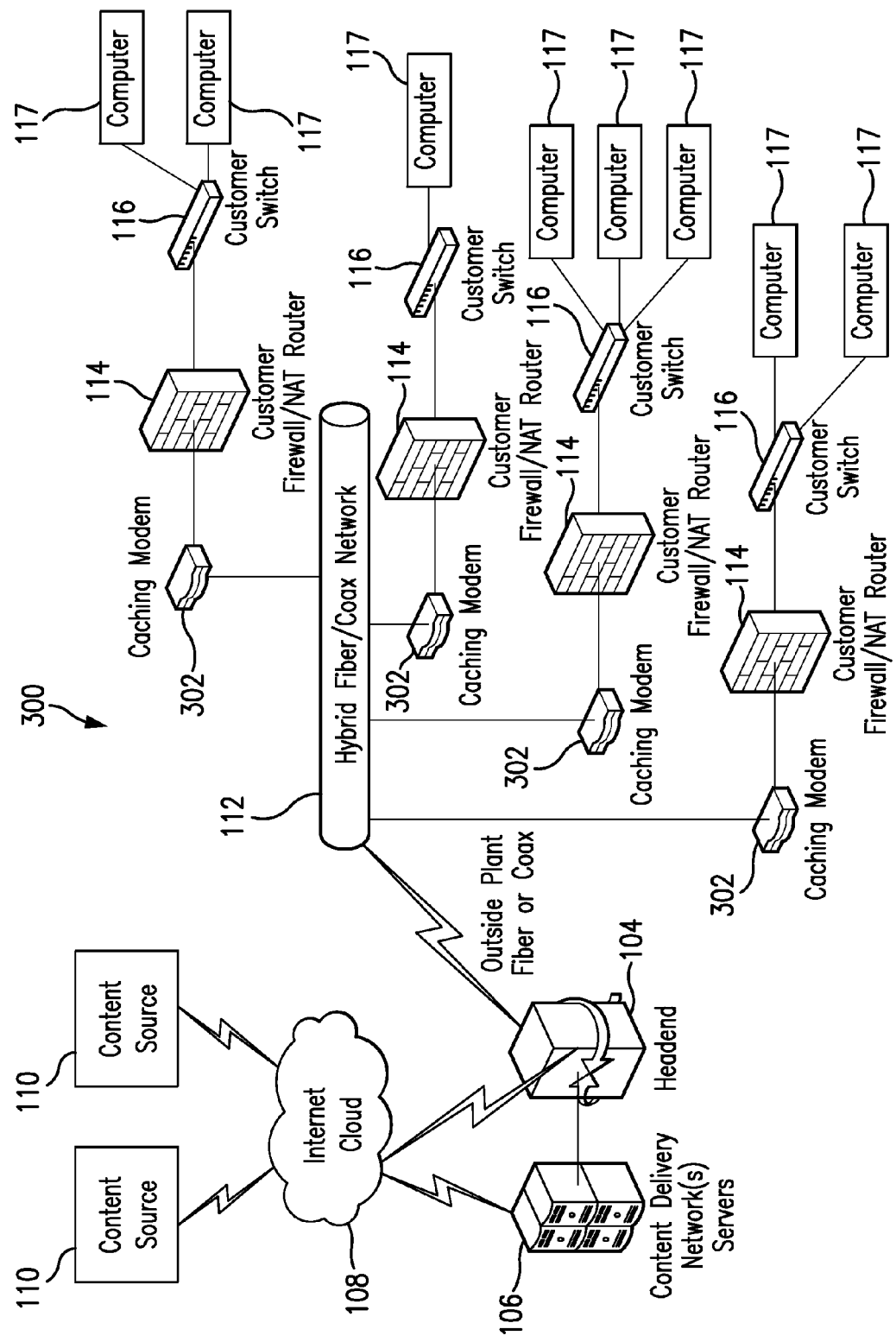
FIG. 3 is a schematic diagram illustrating an example of a data distribution system in which one or more modems incorporate a caching device according to one embodiment of the present invention.

FIG. 3 is a schematic diagram illustrating an example of a data distribution system 300 embodying aspects of the present invention. In one non-limiting embodiment, the data distribution system 300 may be similar to the conventional data distribution system 100 illustrated in FIG. 1, except that one or more of the modems 102 has been replaced with a caching modem 302. In FIG. 3, common reference numerals are used to refer to corresponding elements of the conventional data distribution system 100 illustrated in FIG. 1 and described above, and a further description of the corresponding elements is omitted.

In some embodiments, each caching modem 302 receives content from a headend 104. The data distribution system 300 may be, for example, a cable system in which the one or more caching modems 302 (and any modems 102 in system 300) are cable modems and in which the headend 104 includes a cable modem termination system (CMTS). The CMTS may provide high speed data services, such as cable internet or voice over internet protocol (VOIP), to end users (e.g., subscribers or customers). In other embodiments, the data distribution system 300 may be a digital subscriber line (DSL) system in which the one or more caching modems 302 (and any modems 102 in system 300) are DSL modems and in which the headend 104 includes a DSL access multiplexer (DSLAM).

In some embodiments, the non-local network 112 may have lower data-transfer rates and/or larger geographic area and/or use leased telecommunication lines. In some embodiments, the non-local network 112 may be a wide area network (WAN) or metropolitan area network (MAN). In some embodiments, the non-local network 112 may be, for example, a broadband network, such as a hybrid fiber/coaxial (HFC) network, or telephone network. An end user may receive and/or transmit information from/to non-local network 112 using equipment at the end user's premises (i.e., customer-premises equipment (CPE)), which may include a caching modem 302. The CPE may additionally include a firewall/router 114, switch 116 and one or more computers 117, which may be connected over a local area network (in contrast to the non-local network leading up to the customer premises).

Figure 2:
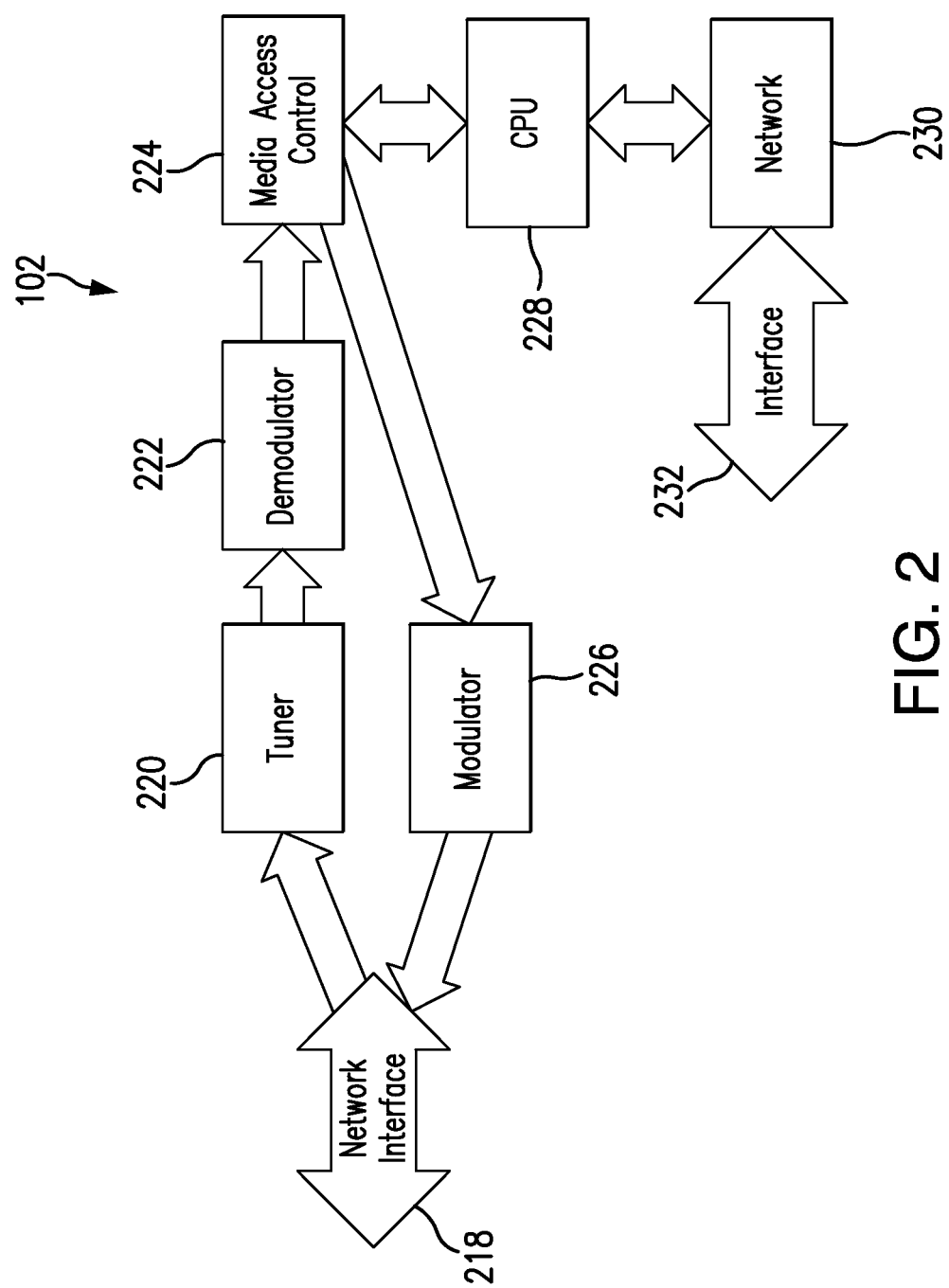
FIG. 2 is a schematic diagram illustrating an example of a conventional cable modem.
Figure 4:
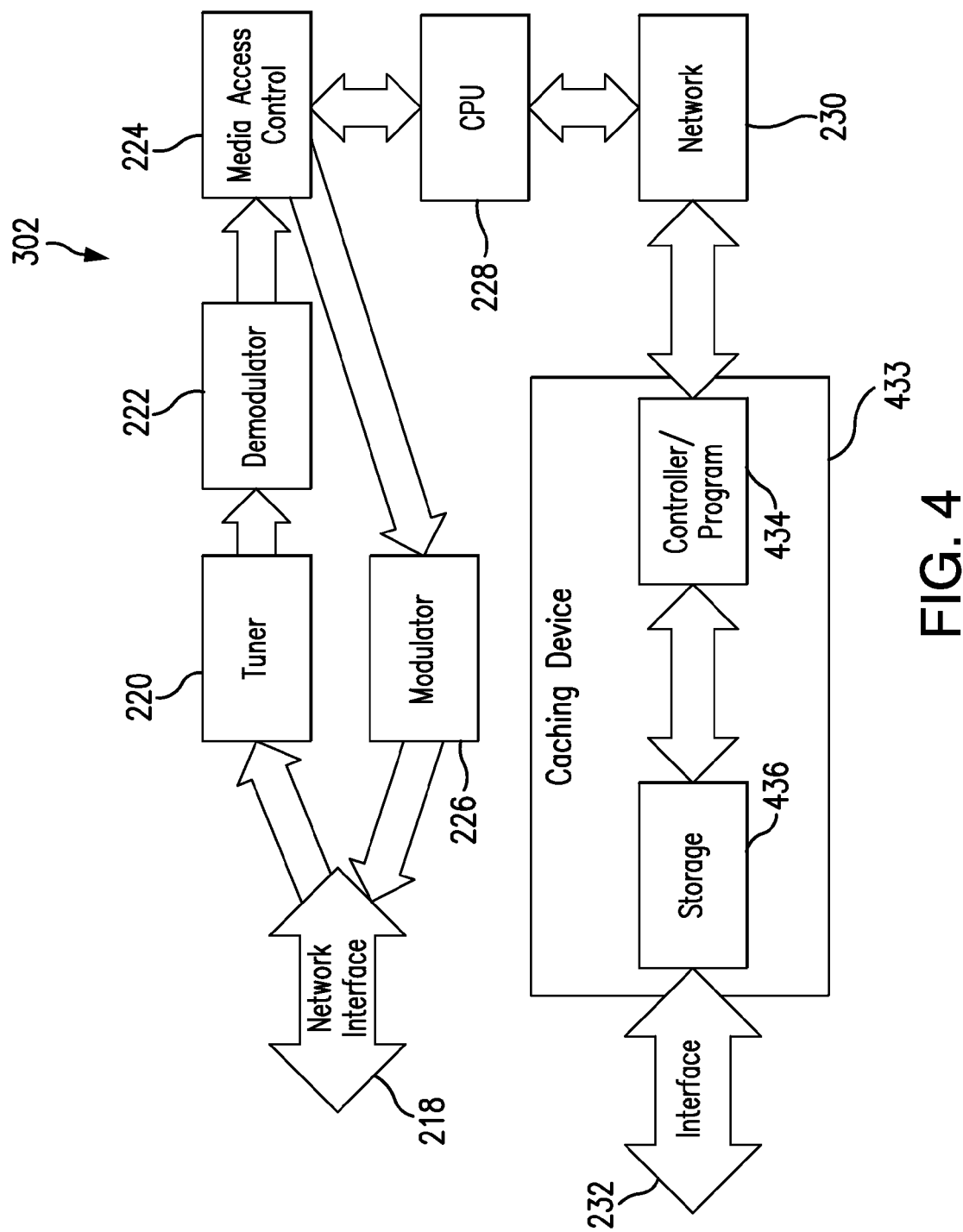
FIG. 4 is a schematic diagram illustrating an example of a cable modem incorporating a caching device according to one embodiment of the present invention.

FIG. 4 is a schematic diagram illustrating an embodiment of a caching modem 302 embodying aspects of the present invention. In the illustrated embodiment, the caching modem 302 is a cable modem. In one non-limiting embodiment, the caching modem 302 may be similar to the conventional cable modem 102 illustrated in FIG. 2, except that caching modem 302 may additionally include a caching device 433. However, this is not required, and other embodiments of caching modem 302 may include caching device 433 in a configuration of modem components different than that shown in FIG. 2. In FIG. 4, common reference numerals are used to refer to corresponding elements of the conventional modem 102 illustrated in FIG. 2 and described above, and a further description of the corresponding elements is omitted.

In some embodiments, as illustrated in FIG. 4, the caching device 433 is connected between the interface 232 and network components 230. In some embodiments, the caching device 433 may include a controller (i.e., processor or computer) 434 and a storage medium 436. In one non-limiting embodiment, the storage medium 436 may be a nonvolatile storage medium, such as an electrically erasable programmable read only memory (EEPROM) or flash memory. However, in other embodiments, other types of storage media may be used. In some embodiments, the controller 434 may unpack and pack the data stream and cache data locally in the storage medium 436. For example, in one non-limiting embodiment, the controller 434 may perform a database, compression, and decompression function that is transparent to the end user. Further, in some non-limiting embodiments, when the storage medium 436 becomes full, the controller 434 may overwrite content already stored in storage medium 436. In one embodiment, the controller 434 may use a time-based algorithm to select old, stale and/or expired stored content to overwrite. In another embodiment, the controller 434 may additionally or alternatively determine which to the stored content to overwrite based on expiration notes received with (or otherwise associated with) the stored content.

In the embodiment illustrated in FIGS. 3 and 4, the caching device 433 is part of a caching modem 302. However, this is not required. In other embodiments, the caching device 433 may be a standalone device, and the data distribution system 300 may use a conventional modem 102 connected to the standalone caching device 433 (e.g., a standalone caching device 433 may be connected between a conventional modem 102 and a router 114).

In some embodiments, the data distribution system 300 may include an intelligence platform. The intelligence platform may, for example, be hosted at headend 104 or in cloud 104. The intelligence platform may determine a file or group of files (i.e., content) for delivery to a group of end users' CPEs via multicast (i.e., a single transmission of content to a plurality of CPEs). The file(s) of the multicast may be cached in storage media 436 of respective caching devices 433 receiving the multicast.

In some embodiments, the intelligence platform may determine which file(s) to include in the multicast delivery based on statistics received from one or more caching modems 302. In some non-limiting embodiments, the statistics may include data about network traffic and/or particular software run by the end users. In some non-limiting embodiments, the intelligence platform may use predictive methods to determine, based on the received statistics, which file(s) are likely to be relevant to and/or accessed by the one or more end users. For example, in one non-limiting embodiment, the intelligence platform may determine which file(s) to include in the multicast delivery based on the needs of the group of users (e.g., advertisements targeting demographics of which one or more end users are (or likely are) a part, updates for particular software run by one or more end users or particular television shows and/or movies watched by one or more end users). In other embodiments, the intelligence platform may additionally or alternatively determine which file(s) to include in the multicast based on other factors, such as, for example, payments for including one or more files in the multicast (i.e., advertisers or other content providers may pay to have their content included in the multicast).

In some non-limiting embodiments, the controller 434 of a caching device 433 may be configured to gather network traffic statistics (e.g., statistics regarding an end-user's browsing history and/or software being run by the end-user). For instance, in one non-limiting embodiment, the controller 434 may determine what software is being run by the end-user based on browser headers and/or Internet Group Management Protocol (IGMP) queries. The controller 434 may be further configured to report the statistics back to an intelligence platform hosted at the headend 104 or in a cloud 104, which, as explained above, may use the statistics to determine content (e.g., web page(s), advertisement(s) targeting specific demographics, software update(s) and/or service pack(s), television show video(s)) most likely to be relevant to the end-user. Based on the statistics received from one or more caching modems 302, the intelligence platform may, over time, determine content that is progressively more likely to be relevant to end users, and this content may be included in the multicast packages for caching at the end users' caching modems 302.

The end user may transparently access the delivered content through local storage in the storage media 436 of the caching devices 433. As the delivered content is already in the local storage, the delivered content may be delivered transparently at local network speed to the end user. In this way, the burden on the non-local network (e.g., cable network) is reduced.

Figure 5:
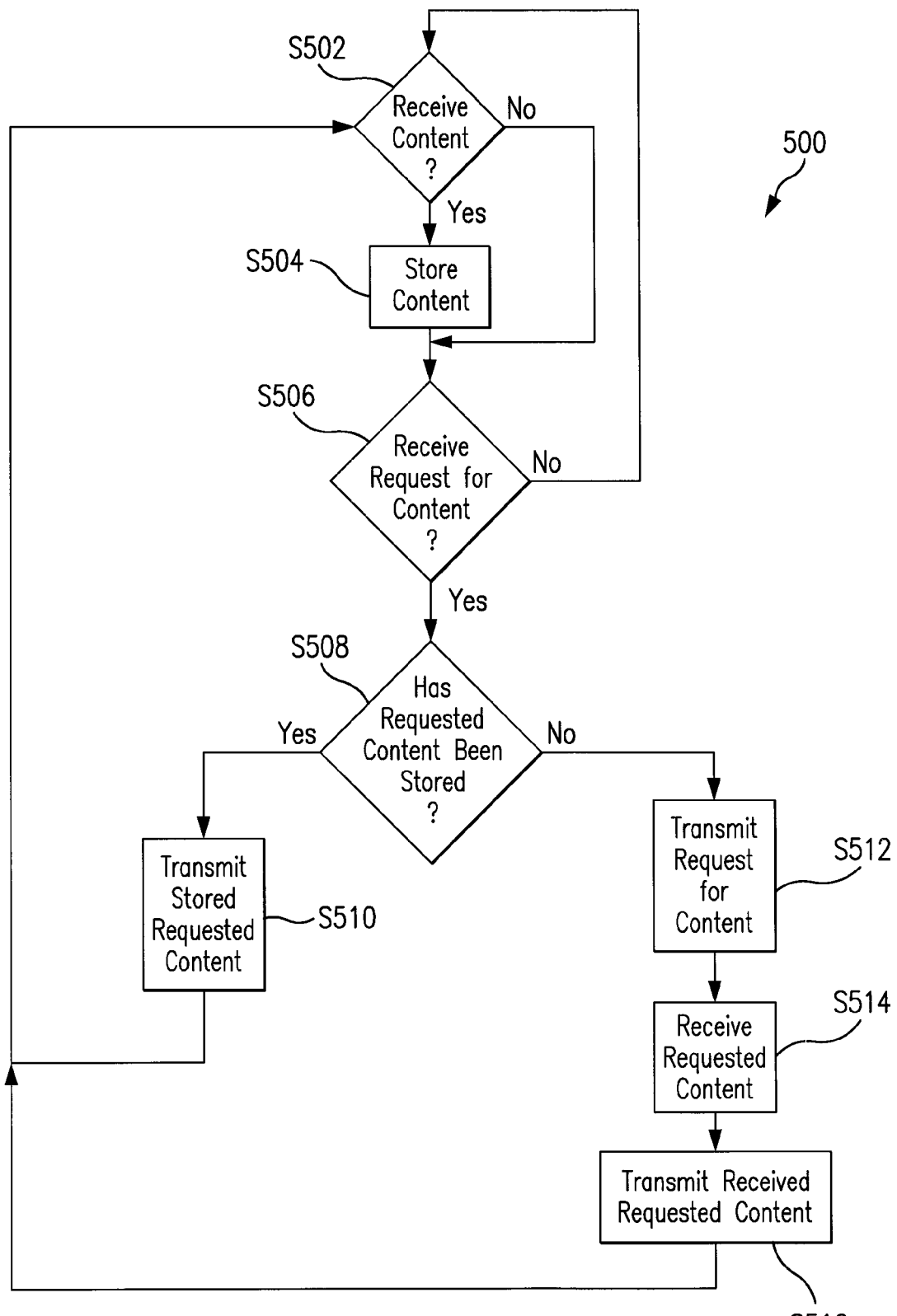
FIG. 5 is a flowchart illustrating an example caching process performed by a caching device according to one embodiment of the present invention.

FIG. 5 is a flowchart illustrating a process 500 that may be performed by the caching device 433 according to one embodiment of the present invention. In some embodiments, the controller 434 is configured to control the caching device 433 to perform one or more of the steps of the process 500.

In a step S502, the caching device 433 may receive content over the non-local network 112 (e.g., from one or more CDN servers 106 and/or one or more content sources 110). The caching device 433 may receive the content via network interface 218, tuner 220, demodulator 222, MAC controller 224, CPU 226 and network components 230. In one non-limiting embodiment, the received content may be a software update, such as, for example, an operating system update, web browser update or other program update. In other embodiments, the received content may be other content, such as, for example, video and/or audio content, one or more documents, one or more advertisements or one or more webpages.

In some non-limiting embodiments, the content received in step S502 is received over the non-local network 112 as part of a multicast. In some embodiments, the multicast may occur at a predetermined time, but this is not required. For example, in other embodiments, the multicast may occur at any time initiated by the multicaster.

In a step S504, if content has been received in step S502, the caching device 433 may store (i.e., cache) the received content in storage medium 436. In some embodiments, if no content was received in step S502, the process 500 may skip step S504. In some embodiments, the end-user may have the option of turning the caching feature of the caching modem 302 off, and, if the caching feature were turned off, the caching device 433 would not store the received content.

In some non-limiting embodiments, step S504 may include determining whether to store the received content. For example, in one non-limiting embodiment, the controller 434 may determine whether the received content is multicast intended to be cached in the storage medium 436 of the caching device 433, and, if so, stored the received content. In another non-limiting embodiment, content may be transmitted in data packets, and the controller 434 may determine whether to cache, in the storage medium 436, content received in a data packet based on whether the data packet includes a header with the MAC address of the caching modem 302.

In a step S506, the caching device 433 may receive a request for content from a computer 117 of an end user's CPE (e.g., from a computer 117 to which the caching modem 302 is connected through a router 114 and switch 116). The request may be generated in response to an end user's action, or the request may be generated automatically by the end user's CPE. In one non-limiting embodiment, the requested content may be a software update, such as, for example, an operating system update, web browser update or other program update. In other embodiments, other content may be requested, such as, for example, video and/or audio content, one or more documents, one or more advertisements or one or more webpages. In some embodiments, if no request for content was received in step S506, the process 500 may return to step S502.

In a step S508, if a request for content is received in step S506, the caching device 433 may determine whether the requested content is stored in the storage medium 436. In a step S510, if the requested content is determined in step S508 to be stored in the storage medium 436, the caching device 433 may transmit the requested content from the storage medium 436 to the computer 117 of the end user's CPE (e.g., to the computer 117 that requested the content by way of interface 232, router 114 and switch 116). In some embodiments, because the requested content is stored in the storage medium 436, the caching device 433 does not transmit the request for content over the non-local network 112. As a result, if the requested content is already stored in the CPE (e.g., in storage medium 436), the request for content does not have to traverse the non-local network 112, and non-local network traffic resulting from requests for content from individual CPEs is reduced.

In contrast, process 500 may perform steps S512, S514 and S516 if the requested content is not stored in the storage medium 436. In step S512, if the requested content is determined in step S508 to not be stored in the storage medium 436, the device 433 may transparently (i.e., without the end user's awareness) transmit the request for content (e.g., via network components 230, CPU 228, MAC controller 224, modulator 226 and network interface 218) over the non-local network 112 to one or more content delivery network servers 106 or to a content source 112. In step S514, the caching device 433 may receive the requested content over the non-local network 112 (e.g., via network interface 218, tuner 220, demodulator 222, MAC controller 224, CPU 226 and network components 230). In a step S516, the caching device 433 may transmit the received requested content to the computer 117 of the end user's CPE (e.g., to the computer 117 that requested the content by way of interface 232, router 114 and switch 116).

According to some embodiments, absolute edge caching moves the distribution of content (e.g., large content) right into the end user's CPE.

In some embodiments, the caching device 433 may take advantage of multicast and the very nature of cable as a shared medium to send content (e.g., large files) just once over a non-local cable network right into many end users' CPEs for later retrieval. In one non-limiting embodiment, content from one or more CDN servers 106 or one or more content sources 110 may be delivered as a multicast broadcast over a non-local network (e.g., non-local network 112) to all the listening caching modems 302 (e.g., a few times a day) at once instead of individually delivering the content in response to each request. This has the ability to reduce the bandwidth utilization on a provider's non-local network significantly and would improve the end user experience by providing access to the cached internet content at local network (e.g., Ethernet) speeds. Thus, absolute edge caching is a win-win for content providers, network operators and end users.

In one non-limiting example, embodiments of the edge caching invention may be applied to a particular operating system (e.g., Windows® operating system) update. Instead of each individual end user having to traverse the entire non-local network 112 (e.g., a cable network) to access a CDN server 106 or worse, to traverse the internet transit network 108 to reach a content source 110 (e.g., the content source of Microsoft®), the caching device 433 may recognize that a user is running the particular operating system and thus has a high probability that the user will request or need this software update. The software update may be sent out via multicast at a predetermined time to the CPE and other CPEs having caching devices 433. The update may be available to the end user immediately after the CPE receives it. The user may retrieve the update locally at the user's local network speeds. In this way, the entire non-local network 112 may be freed up for real-time tasks.

In the descriptions above, unless otherwise specified, connections may be wired connections and/or wireless connections.

Embodiments of the present invention have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

What is claimed is:

1. A method for reducing transmissions over a non-local network in a data distribution system comprising the non-local network, a headend connected to the non-local network, a content delivery network server connected to the headend, a content source connected to the headend and an end user's customer premises equipment (CPE) connected to the non-local network, wherein the end user's CPE comprises a computer and a caching device including a controller and a storage medium, the method comprising:

gathering, by the caching device, network traffic statistics from which software being run by the computer of the end user's CPE is capable of being determined;
transmitting, by the caching device, the network traffic statistics over the non-local network to an intelligence platform;
receiving, by the caching device, multicast content over the non-local network as part of a multicast, wherein the received multicast content comprises a software update, and the software update was determined by the intelligence platform to likely be relevant to the end-user based on the network traffic statistics;
storing, by the caching device, the received multicast content in the storage medium of the caching device;
receiving, by the caching device, a request for content from the computer of the end user's CPE;
determining, by the caching device, whether the requested content is stored in the storage medium of the caching device;
if the requested content is determined to be stored in the storage medium of the caching device, transmitting, by the caching device, the requested content from the storage medium to the computer of the end user's CPE without transmitting the request for content over the non-local network; and
if the requested content is determined to not be stored in the storage medium of the caching device:
(i) transparently transmitting, by the caching device, the request for content over the non-local network to the content delivery network server or to the content source,
(ii) receiving, by the caching device, the requested content over the non-local network from the content delivery network server or the content source, and
(iii) transmitting, by the caching device, the received requested content to the computer of the end user's CPE.

2. The method of claim 1, wherein the end user's CPE comprises a router, and the caching device receives the request for content from the computer by way of the router.

3. The method of claim 1, wherein the received multicast content comprises video or audio content.

4. The method of claim 1, wherein the non-local network is a cable network.

5. The method of claim 1, wherein the cable network is a hybrid fiber/coaxial network.

6. The method of claim 1, wherein the end user's CPE comprises a modem, and the modem comprises the caching device.

7. A caching device configured to cache data at an end user's customer premises equipment (CPE) connected to a non-local network in a data distribution system comprising the non-local network, a headend connected to the non-local network, a content delivery network server connected to the headend and a content source connected to the headend, wherein the end user's CPE comprises a computer and the caching device, the caching device comprising:

a storage medium; and
a controller configured to:
gather network traffic statistics from which software being run by the computer of the end user's CPE is capable of being determined;
transmit the network traffic statistics over the non-local network to an intelligence platform;
receive multicast content over the non-local network as part of a multicast, wherein the received multicast content was determined by the intelligence platform to likely be relevant to the end-user based on the network traffic statistics, and the received multicast content comprises a software update;

store the received multicast content in the storage medium;

receive a request for content from the computer of the end user's CPE;

determine whether the requested content is stored in the storage medium;

if the requested content is determined to be stored in the storage medium, transmit the requested content from the storage medium to the computer of the end user's CPE without transmitting the request for content over the non-local network; and if the requested content is determined to not be stored in the storage medium:
(i) transparently transmit the request for content over the non-local network to the content delivery network server or to the content source,
(ii) receive the requested content over the non-local network from the content delivery network server or the content source, and
(iii) transmit the received requested content to the computer of the end user's CPE.

8. The caching device of claim 7, wherein the end user's CPE comprises a router, and the request for content is received from the computer by way of a router.

9. The caching device of claim 7, wherein the received multicast content comprises video or audio content.

10. The caching device of claim 7, wherein the non-local network is a cable network.

11. The caching device of claim 7, wherein the cable network is a hybrid fiber/coaxial network.

12. The caching device of claim 7, wherein the end user's CPE comprises a modem, and the caching device is part of the modem.

13. The caching device of claim 12, wherein the modem is a cable modem that comprises, in addition to the caching device:
a network interface configured to transmit and receive content to and from the non-local network;
a demodulator configured to demodulate content received from the non-local network;
a modulator configured to modulate content to be transmitted on the non-local network;
a media access control controller;
a central processing unit; and
an interface configured to transmit and receive content to and from the computer of the end user's CPE.

14. The method of claim 1, wherein the network traffic statistics comprise statistics regarding the end user's browsing history.

15. The method of claim 1, wherein the requested content is transmitted from the storage medium to the computer of the end user's CPE without transmitting a request related to the content over the non-local network.

16. The caching device of claim 7, wherein the network traffic statistics comprise statistics regarding the end user's browsing history.

17. The caching device of claim 7, wherein the requested content is transmitted from the storage medium to the computer of the end user's CPE without transmitting a request related to the content over the non-local network.

18. A data distribution system comprising:
an intelligence platform connected to a non-local network;
an end user's customer premises equipment (CPE) connected to the non-local network, wherein the end user's CPE comprises a computer and a caching device, and the caching device comprises:
a storage medium; and
a controller configured to:
gather network traffic statistics;
transmit the network traffic statistics over the non-local network to the intelligence platform;
receive multicast content over the non-local network as part of a multicast, wherein the received multicast content comprises a software update, and the software update was determined by the intelligence platform to likely be relevant to the end-user based on the network traffic statistics;
store the received multicast content in the storage medium;
receive a request for content from the computer of the end user's CPE;
determine whether the requested content is stored in the storage medium;
if the requested content is determined to be stored in the storage medium, transmit the requested content from the storage medium to the computer of the end user's CPE without transmitting the request for content over the non-local network; and
if the requested content is determined to not be stored in the storage medium:
(i) transparently transmit the request for content over the non-local network to a content delivery network server or to a content source,
(ii) receive the requested content over the non-local network from the content delivery network server or the content source, and
(iii) transmit the received requested content to the computer of the end user's CPE;
wherein the intelligence platform is configured to receive the network traffic statistics over the non-local network, determine software being run by the computer of the end user's CPE based on the network traffic statistics, and determine that the software update is likely relevant to the end-user based on the network traffic statistics.

19. The data distribution system of claim 18, further comprising:
the non-local network;
a headend connected to the non-local network;
the content delivery network server; and
the content source, wherein the content delivery network server and the content source are connected to the headend.

* * * * *